(12) United States Patent
Pyun et al.

(10) Patent No.: US 11,380,242 B2
(45) Date of Patent: Jul. 5, 2022

(54) DATA DRIVER PERFORMING CLOCK TRAINING, DISPLAY DEVICE INCLUDING THE DATA DRIVER, AND METHOD OF OPERATING THE DISPLAY DEVICE

(71) Applicant: Samsung Display Co., Ltd., Yongin-si (KR)

(72) Inventors: Kihyun Pyun, Gwangmyeong-si (KR); Yunmi Kim, Changwon-si (KR); Ji Woong Choi, Incheon (KR)

(73) Assignee: Samsung Display Co., Ltd., Yongin-si (KR)

( * ) Notice: Subject to any disclaimer, the term of this patent is extended or adjusted under 35 U.S.C. 154(b) by 172 days.

(21) Appl. No.: 16/705,114

(22) Filed: Dec. 5, 2019

(65) Prior Publication Data

US 2020/0184877 A1 Jun. 11, 2020

(30) Foreign Application Priority Data

Dec. 7, 2018 (KR) ......................... 10-2018-0157159

(51) Int. Cl.
*G09G 3/20* (2006.01)
*G06F 1/04* (2006.01)
*G06N 20/00* (2019.01)

(52) U.S. Cl.
CPC ............. *G09G 3/2092* (2013.01); *G06F 1/04* (2013.01); *G06N 20/00* (2019.01); *G09G 2300/0828* (2013.01); *G09G 2310/027* (2013.01)

(58) Field of Classification Search
None
See application file for complete search history.

(56) References Cited

U.S. PATENT DOCUMENTS

| 9,417,683 | B2 | 8/2016 | Nakayama et al. |
| 9,524,693 | B2 | 12/2016 | Hong et al. |
| 9,583,070 | B2 | 2/2017 | Lin et al. |
| 10,319,286 | B2 | 6/2019 | Do et al. |
| 2003/0146887 | A1* | 8/2003 | Mametsuka ......... G09G 3/3291 345/76 |
| 2004/0125239 | A1 | 7/2004 | Rahn et al. |

(Continued)

FOREIGN PATENT DOCUMENTS

| CN | 103794184 A | 5/2014 |
| CN | 104658493 A | 5/2015 |

(Continued)

*Primary Examiner* — Parul H Gupta
(74) *Attorney, Agent, or Firm* — Lewis Roca Rothgerber Christie LLP (57) ABSTRACT

A display device includes a controller to generate a start frame control signal having a first level in an active period and a second level in a blank period, a load signal toggling between the first level and the second level in the active period and having the second level in the blank period, and a data signal including image data in the active period and a training pattern in the blank period, and a data driver to recover the image data from the data signal based on an internal clock signal to provide display pixels with data voltages in the active period, and to perform a training operation for the internal clock signal using the training pattern in the data signal when both of the start frame control signal and the load signal are maintained as the second level for more than a reference time in the blank period.

14 Claims, 8 Drawing Sheets

(56) References Cited

U.S. PATENT DOCUMENTS

| | | | |
|---|---|---|---|
| 2008/0219401 A1* | 9/2008 | Tobita | G11C 19/28 377/79 |
| 2010/0225620 A1 | 9/2010 | Lee | |
| 2011/0279162 A1 | 11/2011 | Deng et al. | |
| 2012/0056870 A1 | 3/2012 | Koh | |
| 2016/0351129 A1 | 12/2016 | Kim et al. | |
| 2017/0309220 A1* | 10/2017 | Kim | G09G 3/2092 |
| 2019/0340990 A1 | 11/2019 | Koo et al. | |

FOREIGN PATENT DOCUMENTS

| | | |
|---|---|---|
| CN | 106023910 A | 10/2016 |
| CN | 107274842 A | 10/2017 |
| CN | 108010488 A | 5/2018 |
| KR | 10-2017-0122357 A | 11/2017 |

\* cited by examiner

DATA DRIVER PERFORMING CLOCK TRAINING, DISPLAY DEVICE INCLUDING THE DATA DRIVER, AND METHOD OF OPERATING THE DISPLAY DEVICE

CROSS-REFERENCE TO RELATED APPLICATION

This application claims priority to and the benefit of Korean Patent Application No. 10-2018-0157159, filed on Dec. 7, 2018 in the Korean Intellectual Property Office (KIPO), the content of which is incorporated herein in its entirety by reference.

BACKGROUND

1. Field

Exemplary embodiments of the present inventive concept relate to display devices, and, more particularly, to data drivers performing clock training, display devices including the data drivers, and methods of operating the display devices.

2. Description of the Related Art

A display device includes a display panel including a plurality of pixels, a data driver providing data voltages to the plurality of pixels, a gate driver providing gate signals to the plurality of pixels, and a controller controlling the data driver and the gate driver.

The controller transfers image data to the data driver to provide the plurality of pixels with the data voltages corresponding to the image data. In order to transfer the image data, a high speed interface, such as a unified standard interface for TV (USI-T) (a USI-T interface) may be used between the controller and the data driver.

In a display device using the USI-T interface, the controller may transmit a clock-embedded data signal, and the data driver may recover a clock signal from the clock-embedded data signal by using a clock data recovery (CDR) circuit, and may sample and restore a data signal using the recovered clock signal. To allow the recovered clock signal to have a desired frequency and/or a desired phase, the controller may transfer, as the clock-embedded data signal, a training pattern that periodically toggles, and may further transfer a start frame control (SFC) signal having a low level to inform that the training pattern is transferred. The data driver may perform a clock training operation (or a locking operation) using the training pattern in response to the SFC signal having the low level.

However, due to coupling or impedance mismatching between a line through which the SFC signal is transferred and another line, a fluctuation of a power supply voltage, etc., a glitch may occur in the SFC signal. In case of the occurrence of the glitch, a level of the SFC signal may be detected as a wrong level, the recovered clock signal may not have the desired frequency and/or the desired phase, and thus an operation error of the data driver may occur.

SUMMARY

Aspects of some example embodiments are directed toward a display device capable of preventing or protecting from an operation error of a data driver.

Aspects of some example embodiments are directed toward a data driver capable of preventing or protecting from an operation error of the data driver.

Aspects of some example embodiments are directed toward a method of operating a display device capable of preventing or protecting from an operation error of a data driver.

According to example embodiments, there is provided a display device including a display panel including a plurality of pixels, a controller configured to generate a start frame control signal that has a first level in an active period and has a second level in a blank period, a load signal that toggles between the first level and the second level in the active period and has the second level in the blank period, and a data signal that includes image data in the active period and includes a training pattern in the blank period, and a data driver configured to recover the image data from the data signal based on an internal clock signal to provide the plurality of pixels with data voltages corresponding to the recovered image data in the active period, and to perform a training operation for the internal clock signal using the training pattern included in the data signal when both of the start frame control signal and the load signal are maintained as the second level for more than a reference time in the blank period.

In example embodiments, the reference time may correspond to a reference number of training pulses included in the training pattern.

In example embodiments, the data driver may include a glitch removal circuit configured to generate a lock enable signal when both of the start frame control signal and the load signal are maintained as the second level for more than the reference time, a clock data recovery circuit configured to recover the image data from the data signal by sampling the image data included in the data signal in response to the internal clock signal in the active period, and to perform the training operation for the internal clock signal in response to the lock enable signal in the blank period, and a data converting circuit configured to convert the recovered image data into the data voltages, and to provide the data voltages to the plurality of pixels in the active period.

In example embodiments, the glitch removal circuit may include a level determination circuit configured to generate an enable signal having the first level when both of the start frame control signal and the load signal have the second level, and a maintenance determination circuit configured to generate the lock enable signal having the first level when the enable signal is maintained as the first level for more than the reference time.

In example embodiments, the level determination circuit may include a Schmitt trigger circuit configured to determine a level of the start frame control signal, and a NOR gate configured to perform a NOR operation on an output signal of the Schmitt trigger circuit and the load signal.

In example embodiments, the maintenance determination circuit may include a plurality of serially connected flip-flops configured to sequentially output the enable signal, each of the plurality of serially connected flip-flops having a clock terminal receiving the data signal, and at least one AND gate configured to perform an AND operation on output signals of the plurality of serially connected flip-flops.

In example embodiments, each of the plurality of serially connected flip-flops may be configured to store and output an input signal at an edge of each training pulse of the training pattern included in the data signal.

In example embodiments, the reference time may be determined by a number of the plurality of serially connected flip-flops.

According to example embodiments, there is provided a data driver included in a display device. The data driver includes a glitch removal circuit configured to receive, from a controller included in the display device, a start frame control signal that has a first level in an active period and has a second level in a blank period, and a load signal that toggles between the first level and the second level in the active period and has the second level in the blank period, and to generate a lock enable signal when both of the start frame control signal and the load signal are maintained as the second level for more than a reference time, a clock data recovery circuit configured to receive, from the controller, a data signal that includes image data in the active period and includes a training pattern in the blank period, to recover the image data from the data signal by sampling the image data included in the data signal in response to an internal clock signal in the active period, and to perform a training operation for the internal clock signal using the training pattern in response to the lock enable signal in the blank period, and a data converting circuit configured to convert the recovered image data into data voltages, and to provide the data voltages to a plurality of pixels included in the display device in the active period.

In example embodiments, the reference time may correspond to a reference number of training pulses included in the training pattern.

In example embodiments, the glitch removal circuit may include a level determination circuit configured to generate an enable signal having the first level when both of the start frame control signal and the load signal have the second level, and a maintenance determination circuit configured to generate the lock enable signal having the first level when the enable signal is maintained as the first level for more than the reference time.

In example embodiments, the level determination circuit may include a Schmitt trigger circuit configured to determine a level of the start frame control signal, and a NOR gate configured to perform a NOR operation on an output signal of the Schmitt trigger circuit and the load signal.

In example embodiments, the maintenance determination circuit may include a plurality of serially connected flip-flops configured to sequentially output the enable signal, each of the plurality of serially connected flip-flops having a clock terminal receiving the data signal, and at least one AND gate configured to perform an AND operation on output signals of the plurality of serially connected flip-flops.

In example embodiments, each of the plurality of serially connected flip-flops may be configured to store and output an input signal at an edge of each training pulse of the training pattern included in the data signal.

In example embodiments, the reference time may be determined by a number of the plurality of serially connected flip-flops.

According to example embodiments, there is provided a method of operating a display device. In the method, it is determined whether both of a start frame control signal and a load signal are maintained as a low level for more than a reference time, a training operation for an internal clock signal is performed using a training pattern included in a data signal when both of the start frame control signal and the load signal are maintained as the low level for more than the reference time, image data are recovered from the data signal based on the internal clock signal, and an image is displayed by providing a plurality of pixels included in the display device with data voltages corresponding to the recovered image data.

In example embodiments, the reference time may correspond to a reference number of training pulses included in the training pattern.

In example embodiments, to determine whether both of the start frame control signal and the load signal are maintained as the low level for more than the reference time, the start frame control signal is provided to a Schmitt trigger circuit, an enable signal is generated by performing a NOR operation on an output signal of the Schmitt trigger circuit and the load signal, the enable signal is provided to a plurality of serially connected flip-flops, and a lock enable signal representing that both of the start frame control signal and the load signal are maintained as the low level for more than the reference time is generated by performing an AND operation on output signals of the plurality of serially connected flip-flops.

In example embodiments, each of the plurality of serially connected flip-flops may be configured to store and output an input signal at an edge of each training pulse of the training pattern.

In example embodiments, the reference time may be determined by a number of the plurality of serially connected flip-flops.

As described above and according to example embodiments, a display device, a data driver, and a method of operating the display device may perform a training operation for an internal clock signal using a training pattern included in a data signal when both of a start frame control signal and a load signal are maintained as a second level for more than a reference time. Accordingly, even if a glitch occurs in the start frame control signal, the internal clock signal having a desired frequency and/or a desired phase may be generated, and thus an operation error of the data driver may be prevented or reduced.

BRIEF DESCRIPTION OF THE DRAWINGS

Illustrative, non-limiting example embodiments will be more clearly understood from the following detailed description in conjunction with the accompanying drawings.

DETAILED DESCRIPTION

Hereinafter, embodiments of the present inventive concept will be explained in more detail with reference to the accompanying drawings.

Figure 1:
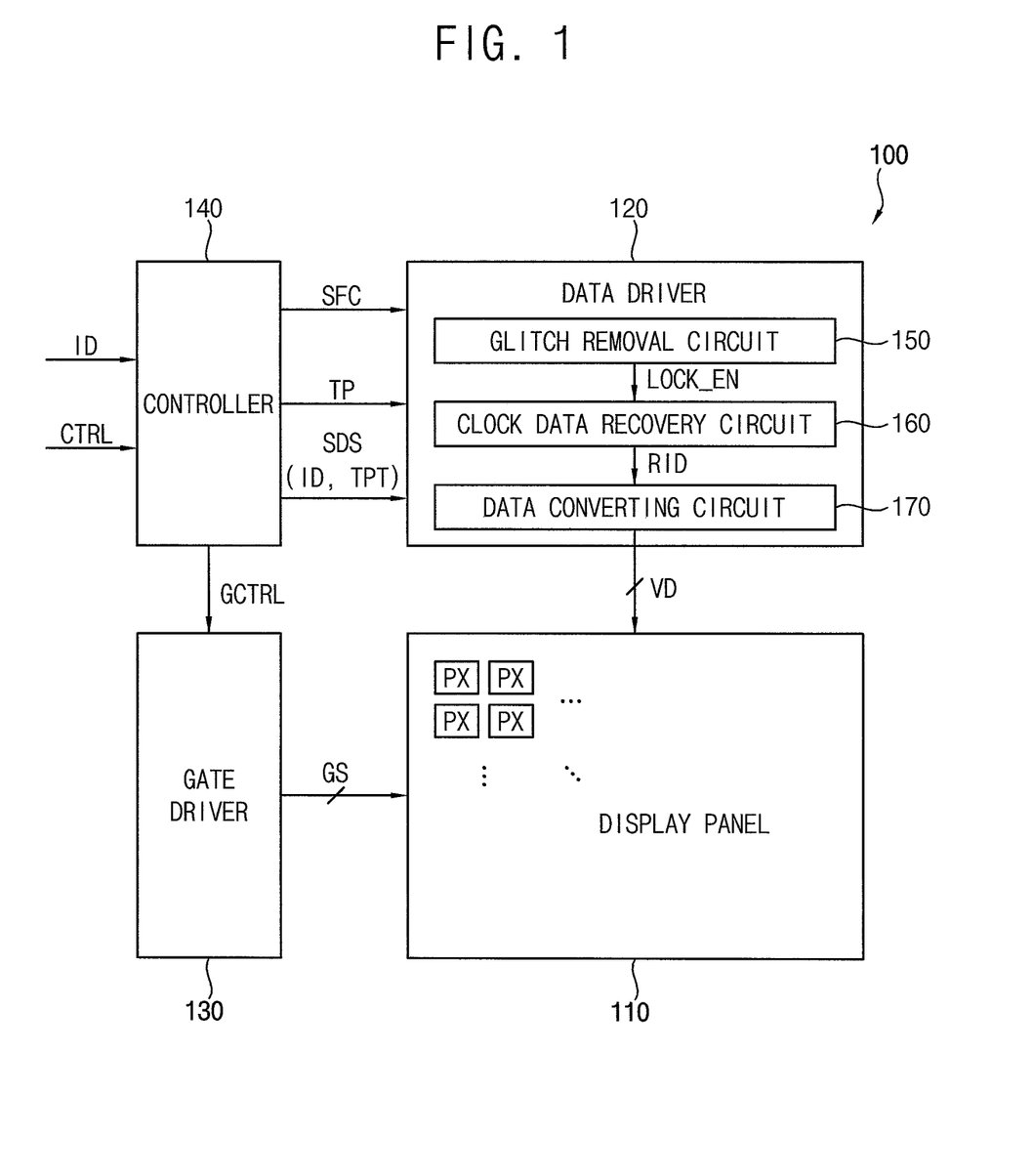
FIG. 1 is a block diagram illustrating a display device according to example embodiments.
Figure 2:
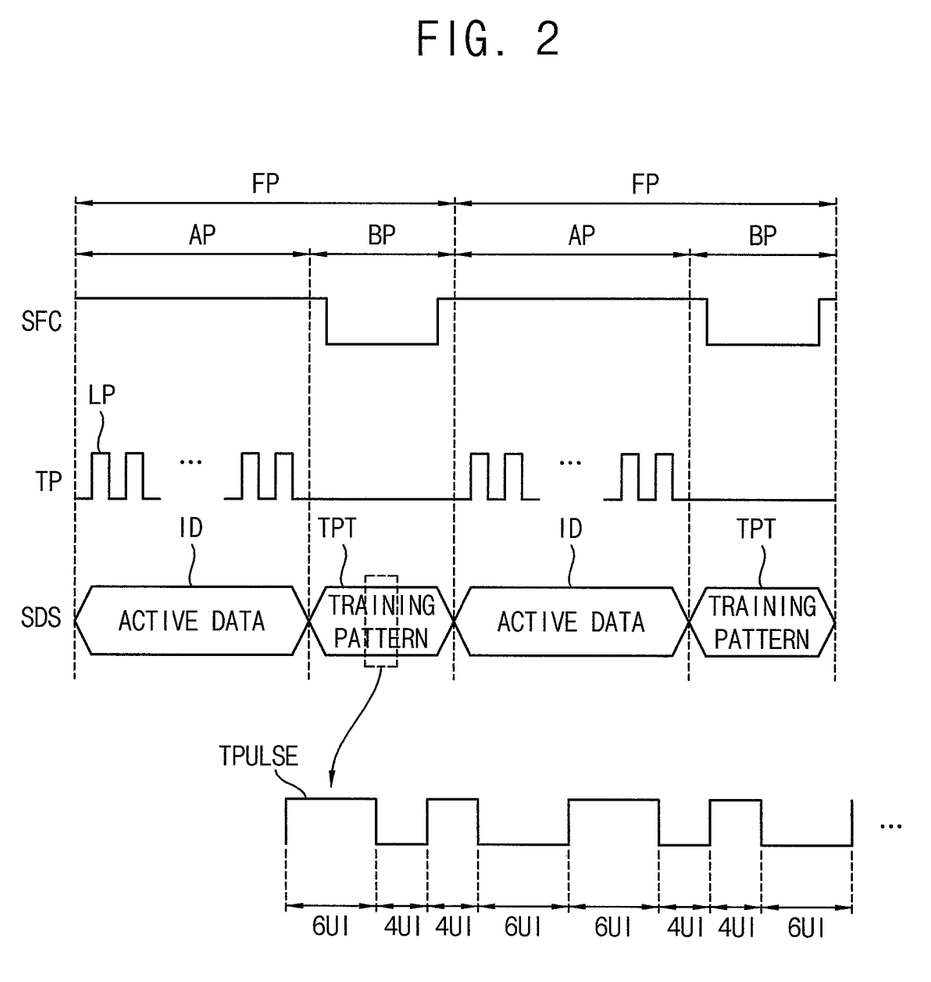
FIG. 2 is a timing diagram illustrating a start frame control signal, a load signal, and a data signal.
Figure 3:
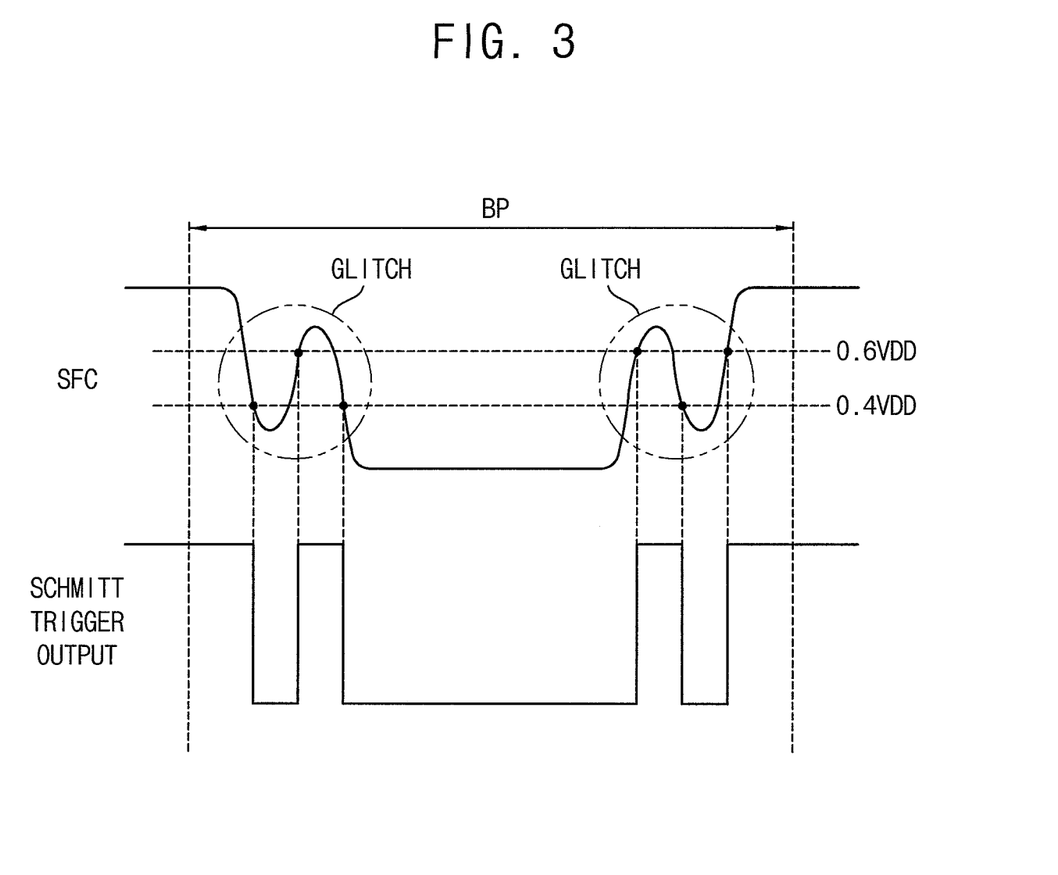
FIG. 3 is a timing diagram illustrating a start frame control signal having a glitch, and an output signal of a Schmitt trigger circuit.

FIG. 1 is a block diagram illustrating a display device according to example embodiments, FIG. 2 is a timing diagram illustrating a start frame control signal, a load signal, and a data signal, and FIG. 3 is a timing diagram illustrating a start frame control signal having a glitch, and an output signal of a Schmitt trigger circuit.

Referring to FIG. 1, a display device 100 may include a display panel 110 including a plurality of pixels PX, a data driver 120 that provides data voltages VD to the plurality of pixels PX, a gate driver 130 that provides gate signals GS to the plurality of pixels PX, and a controller 140 that controls the data driver 120 and the gate driver 130.

The display panel 110 may include a plurality of data lines, a plurality of gate lines, and the plurality of pixels PX connected to the plurality of data lines and the plurality of gate lines. In some example embodiments, each pixel PX may include a switching transistor, and a liquid crystal capacitor connected to the switching transistor, and the display panel 110 may be a liquid crystal display (LCD) panel. However, the display panel 110 may not be limited to the LCD panel, and may be any display panel.

The data driver 120 may generate the data voltages VD based on image data ID and a data control signal output from the controller 140, and may provide the data voltages VD to the plurality of pixels PX through the plurality of data lines. The data control signal may include a start frame control signal SFC and a load signal TP. In some example embodiments, the data control signal may further include, but not be limited to, an output data enable signal, a horizontal start signal, etc. In some example embodiments, between the controller 140 and the data driver 120, a high speed interface, such as a unified standard interface for TV (USI-T) may be used to transfer the image data ID. The image data ID may be transferred in the form of a clock-embedded data signal SDS (hereafter, referred as "data signal SDS") from the controller 140 to the data driver 120. Further, in some example embodiments, the data driver 120 may be implemented with one or more data integrated circuits (ICs). Further, according to some example embodiments, the data driver 120 may be mounted directly on the display panel 110, or may be connected to the display panel 110 in the form of a tape carrier package (TCP). In other example embodiments, the data driver 120 may be integrated in a peripheral portion of the display panel 110.

The gate driver 130 may generate the gate signals GS based on a gate control signal GCTRL output from the controller 140, and may provide the gate signals GS to the plurality of pixels PX through the plurality of gate lines. In some example embodiments, the gate control signal GCTRL may include, but not be limited to, a gate start signal and a gate clock signal. In some example embodiments, the gate driver 130 may be implemented as an amorphous silicon gate (ASG) driver integrated in the peripheral portion of the display panel 110. In other example embodiments, the gate driver 130 may be implemented with one or more gate ICs. Further, according to some example embodiments, the gate driver 130 may be mounted directly on the display panel 110, or may be connected to the display panel 110 in the form of the TCP.

The controller (e.g., the timing controller) 140 may receive the image data ID and a control signal CTRL from an external host processor (e.g., a graphic processing unit (GPU) or a graphic card). In some example embodiments, the image data ID may be RGB data including red image data, green image data and blue image data. In some example embodiments, the control signal CTRL may include, but not be limited to, a vertical synchronization signal, a horizontal synchronization signal, an input data enable signal, a master clock signal, and/or the like. The controller 140 may generate the gate control signal GCTRL, the data control signal and the data signal SDS based on the image data ID and the control signal CTRL. The controller 140 may control an operation of the data driver 120 by providing the data control signal and the data signal SDS to the data driver 120, and may control an operation of the gate driver 130 by providing the gate control signal GCTRL to the gate driver 130.

The controller 140 according to example embodiments may generate the start frame control signal SFC that has a first level in an active period and has a second level in a blank period, the load signal TP that toggles between the first level and the second level in the active period and has the second level in the blank period, and the data signal SDS that includes the image data ID in the active period and includes a training pattern TPT in the blank period.

For example, as illustrated in FIG. 2, each frame period FP of the display device 100 may include the active period AP in which the image data (or active data) ID are output, and a blank period BP (e.g., a vertical blank period) between the active periods AP. The start frame control signal SFC may have a high level in the active period AP, and may have a low level in the blank period BP. By providing the start frame control signal SFC having the low level to the data driver 120 when the training pattern TPT is output as the data signal SDS, the controller 140 may inform the data driver 120 of a period in which a clock training operation using the training pattern TPT is performed. The load signal TP may toggle between the high level and the low level in the active period AP, and may have the low level in the blank period BP. That is, the load signal TP may include a plurality of loading pulses LP in the active period AP. The controller 140 may inform the data driver 120 of a start time point at which the data voltages VD are to be output by providing the loading pulse LP to the data driver 120. In some example embodiments, the number of the plurality of loading pulses LP included in the load signal TP in the active period AP may correspond to the number of horizontal lines included in the display panel 110. The data signal SDS may include the image data (or the active data) ID in the active period AP, and may include the training pattern TPT for performing the clock training operation by the data driver 120 in the blank period BP. The training pattern TPT may include a plurality of training pulses TPULSE. For example, as illustrated in FIG. 2, the plurality of training pulses TPULSE may periodically have a high period of 6 unit interval (UI), a low period of 4 UI, a high period of 4 UI and a low period of 6 UI, but the lengths of the high and low periods may not be limited thereto. Here, the unit interval (UI) may represent a time allocated to transfer 1 bit of the data signal SDS.

A data driver 120 of a related art display device may perform the clock training operation using the training pattern TPT included in the data signal SDS, or a training operation for an internal clock signal of the data driver 120 in response to the start frame control signal SFC having the low level in the blank period BP. To determine a level of the start frame control signal SFC with hysteresis, or to determine the level of the start frame control signal SFC with different reference voltage levels at rising and falling edges, the data driver 120 may include a Schmitt trigger circuit. However, due to coupling or impedance mismatching between a line through which the start frame control signal SFC is transferred and another line, a fluctuation of a power supply voltage, etc., a glitch may occur in the start frame control signal SFC. In particular, in a case where the glitch occurs over a certain level, the level of the start frame control signal SFC may be detected as a wrong level even if the Schmitt trigger circuit is used. For example, as illustrated in FIG. 3, in a case where the glitch corresponding to about 0.6 times of the high level (e.g., 0.6 VDD) occurs when the start frame control signal SFC falls to the low level, the Schmitt trigger circuit may output a signal having the high level even if the Schmitt trigger circuit has different reference voltage levels (e.g., 0.4 VDD and 0.6 VDD) at the rising and falling edges. Further, in a case where the glitch corresponding to about 0.4 times of the high level (e.g., 0.4 VDD) occurs when the start frame control signal SFC rises to the high level, the Schmitt trigger circuit may output a signal having the low level. In this case, in the related art display device, the data driver 120 cannot recover a clock signal having a desired frequency and/or a desired phase, and thus an operation error of the data driver 120 may occur.

To prevent or reduce the operation error of the data driver 120, the data driver 120 according to example embodiments may include not only a clock data recovery circuit 160 and a data converting circuit 170, but also a glitch removal circuit 150.

The glitch removal circuit 150 may receive the start frame control signal SFC that has the first level (e.g., the high level) in the active period AP and has the second level (e.g., the low level) in the blank period BP, and the load signal TP that toggles between the first level and the second level in the active period AP and has the second level in the blank period BP from the controller 140, and may generate a lock enable signal LOCK_EN when both of the start frame control signal SFC and the load signal TP are maintained as the second level (e.g., the low level) for more than a reference time (e.g., when the period of the reference time has been reached and/or passed). In some example embodiments, the reference time may correspond to the reference number of the training pulses TPULSE included in the training pattern TPT. For example, the reference number may be five, and the glitch removal circuit 150 may generate the lock enable signal LOCK_EN when both of the start frame control signal SFC and the load signal TP are maintained as the second level while five training pulses TPULSE are received.

The clock data recovery circuit 160 may receive the data signal SDS that includes the image data ID in the active period AP and includes the training pattern TPT in the blank period BP from the controller 140, may recover the image data ID from the data signal SDS by sampling the image data ID included in the data signal SDS in response to an internal clock signal in the active period AP, and may perform a training operation for the internal clock signal using the training pattern TPT in response to the lock enable signal LOCK_EN in the blank period BP. In some example embodiments, the clock data recovery circuit 160 may include, but not be limited to, a clock recovering unit that performs the training operation (or a locking operation) that adjusts a frequency and/or a phase of the internal clock signal based on the training pattern TPT in response to the lock enable signal LOCK_EN, and generates the internal clock signal having multiple phases (e.g., ten phases), and a data recovering unit that recovers the image data ID by sampling the data signal SDS at every 1 UI based on the internal clock signal having the multiple phases. For example, the clock recovering unit may include a phase locked loop (PLL) circuit and a delay locked loop (DLL) circuit to adjust the frequency and/or the phase of the internal clock signal.

The data converting circuit 170 may convert the recovered image data RID into the data voltages VD, and may provide the data voltages VD to the plurality of pixels PX in the active period AP. In some example embodiments, the data converting circuit 170 may include, but not be limited to, a shift register that sequentially stores the recovered image data RID, a data latch unit that loads the recovered image data RID stored in the shift register in response to the loading pulse LP of the load signal TP, an analog-to-digital converting unit that converts the recovered image data RID output from the data latch unit into the data voltages VD using gamma voltages, and an output buffer unit that outputs the data voltages VD to the plurality of data lines.

As described above, the data driver 120 included in the display device 100 according to example embodiments may perform the training operation for the internal clock signal using the training pattern TPT included in the data signal SDS when both of the start frame control signal SFC and the load signal TP are maintained as the second level (e.g., the low level) for more than the reference time in the blank period BP. Accordingly, even if a glitch occurs in the start frame control signal SFC when the start frame control signal SFC falls to the low level, the training operation may be initiated after the reference time from a time point at which the glitch occurs, and thus the data driver 120 according to example embodiments may generate the internal clock signal having the desired frequency and/or the desired phase, thereby preventing or protecting from the operation error of the data driver 120.

Figure 4:
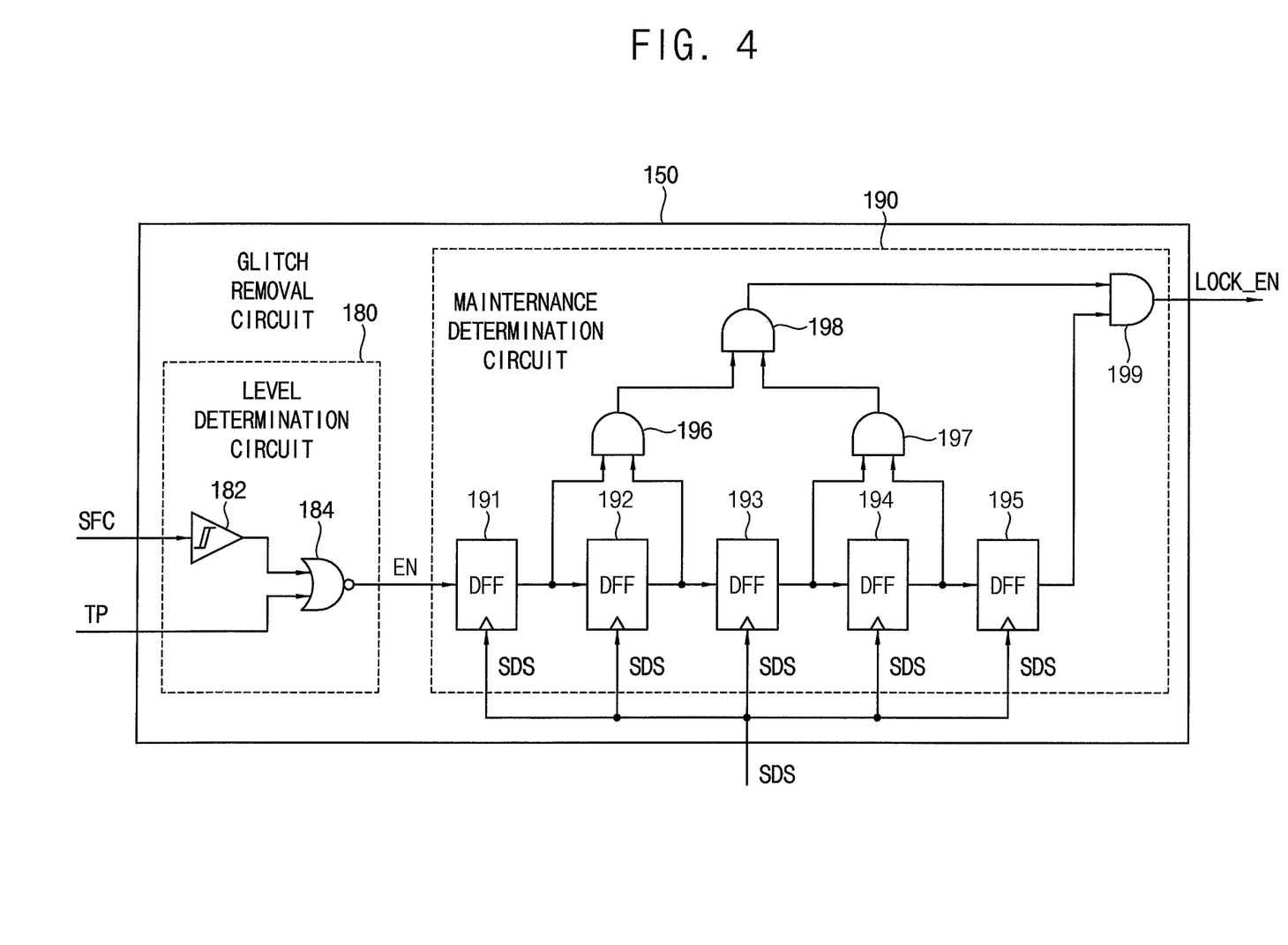
FIG. 4 is a block diagram illustrating a glitch removal circuit included in a data driver according to example embodiments.
Figure 5:
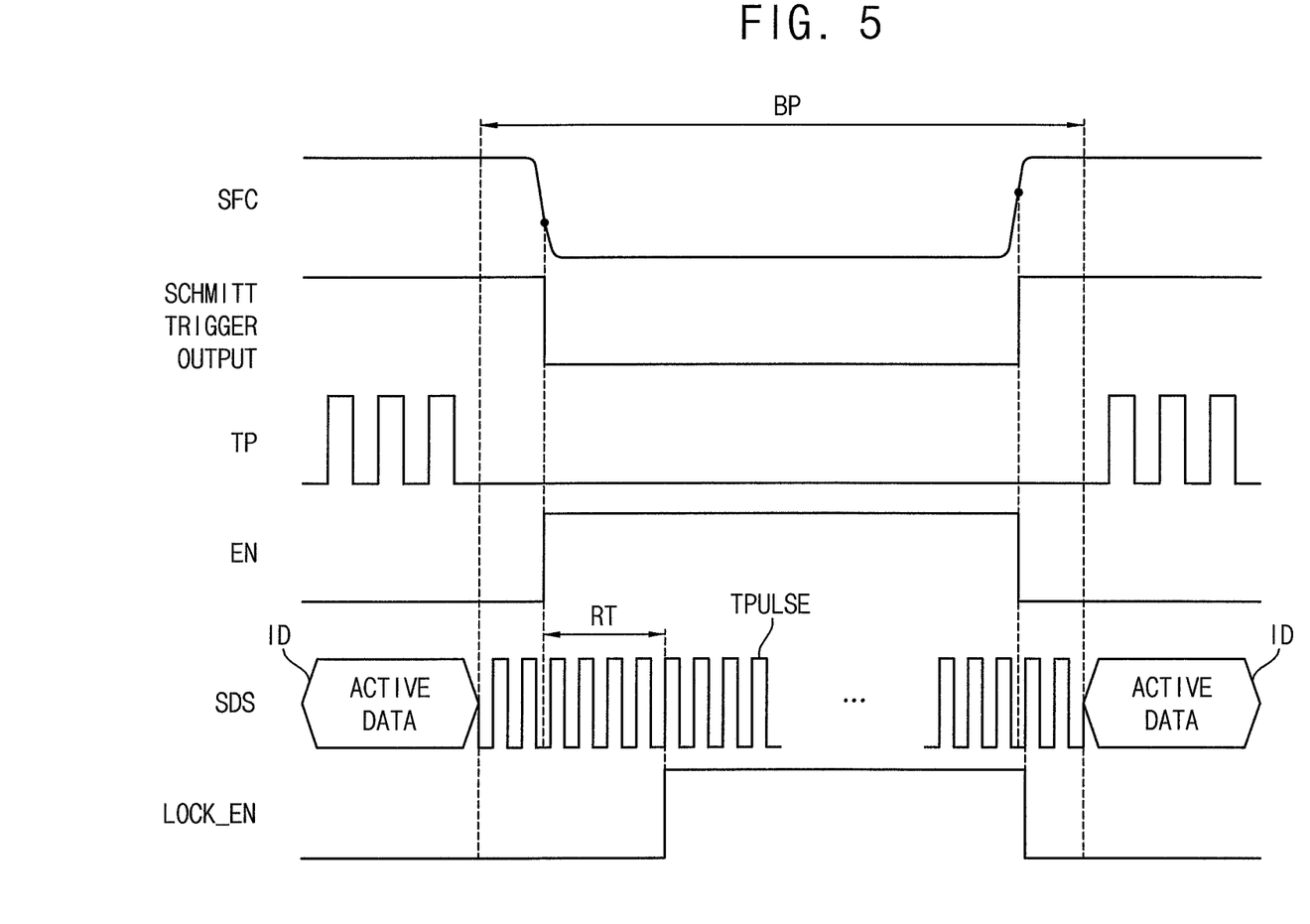
FIG. 5 is a timing diagram for describing an operation of a glitch removal circuit of FIG. 4 in a case where a glitch does not occur in a start frame control signal.
Figure 6:
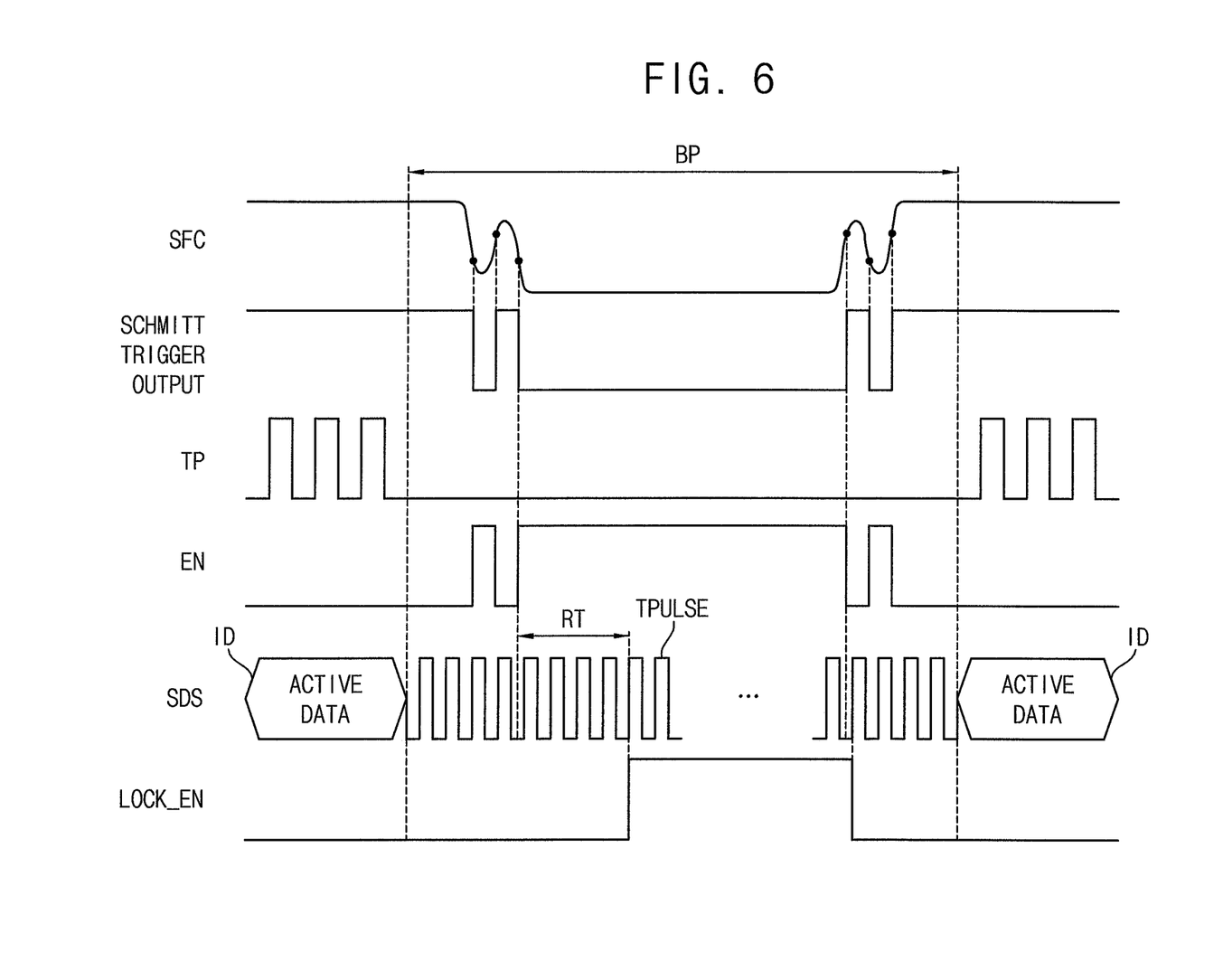
FIG. 6 is a timing diagram for describing an operation of a glitch removal circuit of FIG. 4 in a case where a glitch occurs in a start frame control signal.

FIG. 4 is a block diagram illustrating a glitch removal circuit 120 included in a data driver according to example embodiments, FIG. 5 is a timing diagram for describing an operation of a glitch removal circuit of FIG. 4 in a case where a glitch does not occur in a start frame control signal, and FIG. 6 is a timing diagram for describing an operation of a glitch removal circuit of FIG. 4 in a case where a glitch occurs in a start frame control signal.

Referring to FIG. 4, a glitch removal circuit 150 included in a data driver according to example embodiments may include a level determination circuit 180 that generates an enable signal EN having a first level (e.g., a high level) when both of a start frame control signal SFC and a load signal TP have a second level (e.g., a low level), and a maintenance determination circuit 190 that generates a lock enable signal LOCK_EN having the first level when the enable signal EN is maintained as the first level for more than a reference time.

The level determination circuit 180 may include a Schmitt trigger circuit 182 that determines a level of the start frame control signal SFC, and a NOR gate 184 that performs a NOR operation on an output signal of the Schmitt trigger circuit 182 and the load signal TP. The Schmitt trigger circuit 182 may determine the level of the start frame control signal SFC with hysteresis. That is, the Schmitt trigger circuit 182 may determine the level of the start frame control signal SFC with different reference voltage levels (e.g., 0.6 VDD and 0.4 VDD) at rising and falling edges. Since the NOR operation is performed on the output signal of the Schmitt trigger circuit 182 and the load signal TP, the level determination circuit 180 may output the enable signal EN having the high level when both of the output signal of the Schmitt trigger circuit 182 (or the start frame control signal SFC) and the load signal TP have the low level.

The maintenance determination circuit 190 may include a plurality of serially connected flip-flops 191, 192, 193, 194 and 195 that sequentially output the enable signal EN, and at least one AND gate 196, 197, 198 and 199 that performs an AND operation on output signals of the plurality of serially connected flip-flops 191, 192, 193, 194 and 195. In some example embodiments, each of the plurality of serially connected flip-flops 191, 192, 193, 194 and 195 may be a D flip-flop DFF. Further, in some example embodiments, each of the plurality of serially connected flip-flops 191, 192, 193, 194 and 195 may receive a data signal SDS at a clock terminal, and may store and output an input signal at an edge (e.g., a rising edge) of each training pulse of a training pattern TPT included in the data signal SDS.

For example, as illustrated in FIG. 4, the maintenance determination circuit 190 may include first through fifth flip-flops 191, 192, 193, 194 and 195, and first through fourth AND gates 196, 197, 198 and 199. The first flip-flop 191 may store and output the enable signal EN received from the level determination circuit 180 at a rising edge of a first training pulse, the second flip-flop 192 may store and output the enable signal EN received from the first flip-flop 191 at a rising edge of a second training pulse next to (e.g., following and/or adjacent to) the first training pulse, the third flip-flop 193 may store and output the enable signal EN received from the second flip-flop 192 at a rising edge of a third training pulse next to the second training pulse, the fourth flip-flop 194 may store and output the enable signal EN received from the third flip-flop 193 at a rising edge of a fourth training pulse next to the third training pulse, and the fifth flip-flop 195 may store and output the enable signal EN received from the fourth flip-flop 194 at a rising edge of a fifth training pulse next to the fourth training pulse. Further, the first AND gate 196 may perform an AND operation on the enable signal EN output from the first flip-flop 191 and the enable signal EN output from the second flip-flop 192, the second AND gate 197 may perform an AND operation on the enable signal EN output from the third flip-flop 193 and the enable signal EN output from the fourth flip-flop 194, the third AND gate 198 may perform an AND operation on an output signal of the first AND gate 196 and an output signal of the second AND gate 197, and the fourth AND gate 199 may perform an AND operation on an output signal of the third AND gate 198 and the enable signal EN output from the fifth flip-flop 195. Accordingly, in an example of FIG. 4, the maintenance determination circuit 190 may output the lock enable signal LOCK_EN having the high level when the enable signal EN is maintained as the high level while the first through fifth training pulses are applied.

In some example embodiments, the number of the flip-flops 191, 192, 193, 194 and 195 (and the number of the AND gates 196, 197, 198 and 199) may be determined according to a glitch duration, and the reference time may be determined by the number of the flip-flops 191, 192, 193, 194 and 195. For example, in a case where a glitch occurs only within a time period corresponding to three training pulses from a falling edge of the start frame control signal SFC, the maintenance determination circuit 190 may include only three flip-flops. In this case, the glitch removal circuit 150 may output the lock enable signal LOCK_EN having the high level when both of the start frame control signal SFC and the load signal TP are maintained as the low level while the three training pulses are applied.

Hereinafter, an operation of the glitch removal circuit 150 will be described below with reference to FIG. 4 through FIG. 6.

As illustrated in FIG. 5, in a blank period BP, the data signal SDS may include a training pattern TPT including a plurality of training pulses TPULSE, and the start frame control signal SFC and the load signal TP may have the low level. The Schmitt trigger circuit 182 may output a signal having the low level if the start frame control signal SFC falls to lower than a reference voltage level (e.g., about 0.4 VDD), and the NOR gate 184 may output the enable signal EN having the high level in response to the output signal of the Schmitt trigger circuit 182 having the low level and the load signal TP having the low level. By using the five flip-flops 191, 192, 193, 194 and 195 and the four AND gates 196, 197, 198 and 199, the maintenance determination circuit 190 may output the lock enable signal LOCK_EN having the high level when the enable signal EN is maintained as the high level for a reference time (a reference time period) RT (e.g., for a time period while five training pulses TPULSE are applied). A clock data recovery circuit 160 included in the data driver 120 may perform a clock training operation, or a training operation for an internal clock signal using the training pattern TPT in response to the lock enable signal LOCK_EN having the high level. If the start frame control signal SFC rises to higher than a reference voltage level (e.g., about 0.6 VDD), the level determination circuit 180 may output the enable signal EN having the low level, and the maintenance determination circuit 190 may output the lock enable signal LOCK_EN having the low level at a rising edge of the training pulse TPULSE. The clock data recovery circuit 160 may stop the clock training operation in response to the lock enable signal LOCK_EN having the low level.

Even if a glitch occurs in the start frame control signal SFC, the glitch removal circuit 150 may generate the lock enable signal LOCK_EN having the high level after (approximately) a reference time RT from a time point at which the glitch occurs, thereby preventing or protecting from an operation error of the data driver 120. For example, as illustrated in FIG. 6, if the start frame control signal SFC falls to lower than a reference voltage level (e.g., about 0.4 VDD), the level determination circuit 180 may output the enable signal EN having the high level. In a case where the glitch occurs in the start frame control signal SFC, the enable signal EN may change to the low level, and then to the high level. That is, in the case where the enable signal EN is not maintained as the high level for the reference time (the reference time period) RT (e.g., for a time period while five training pulses TPULSE are applied), the maintenance determination circuit 190 may not output the lock enable signal LOCK_EN having the high level, and the clock data recovery circuit 160 may not initiate the clock training operation. After the occurrence of the glitch, if the enable signal EN is changed to the high level and is maintained as the high level for the reference time RT (e.g., for the time period while the five training pulses TPULSE are applied), the maintenance determination circuit 190 may output the lock enable signal LOCK_EN having the high level, and the clock data recovery circuit 160 may initiate the clock training operation. Accordingly, the clock data recovery circuit 160 may generate the internal clock signal having the desired frequency and/or the desired phase, and thus the operation error of the data driver 120 may be prevented.

Figure 7:
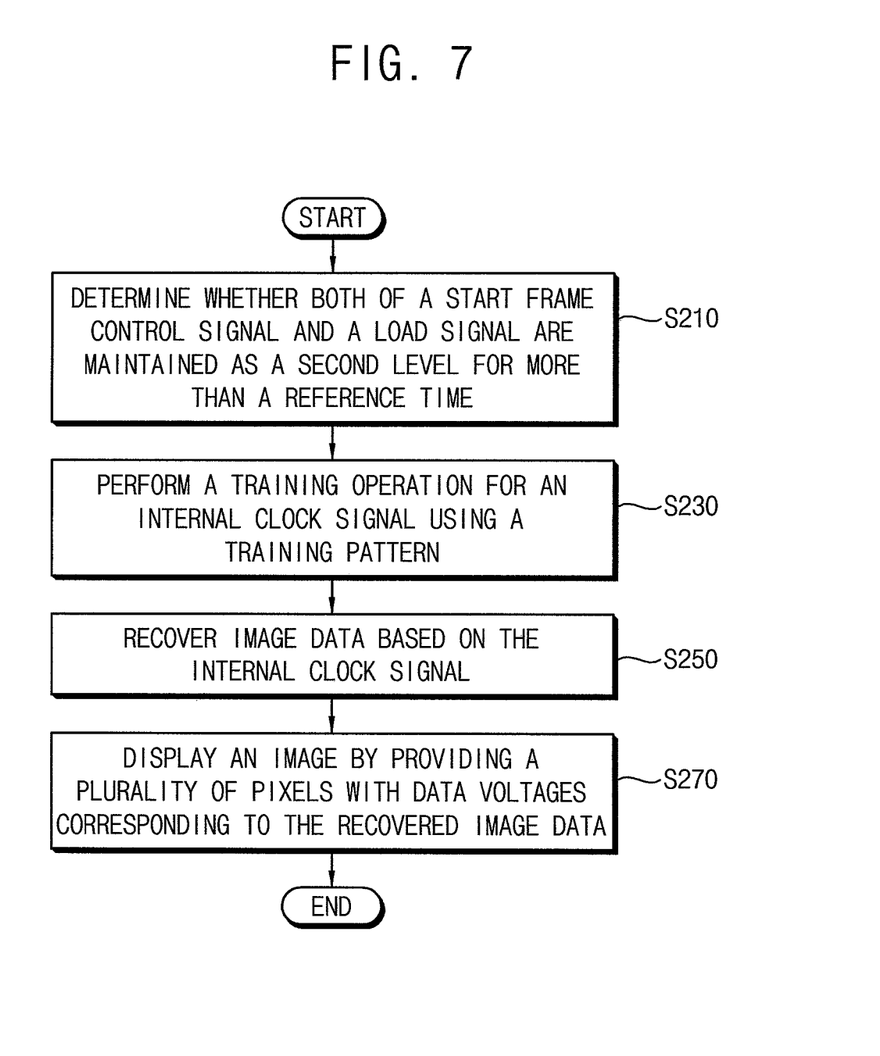
FIG. 7 is a flow chart illustrating a method of operating a display device according to example embodiments.

FIG. 7 is a flow chart illustrating a method of operating a display device according to example embodiments.

Referring to FIG. 1, FIG. 4 and FIG. 7, a glitch removal circuit 150 of a data driver 120 according to example embodiments may determine whether both of a start frame control signal SFC and a load signal TP are maintained as a low level for more than a reference time (S210). In some example embodiments, the reference time may correspond to the reference number of training pulses among a plurality of training pulses included in a training pattern TPT of a data signal SDS received from a controller 140.

In some example embodiments, to determine whether both of the start frame control signal SFC and the load signal TP are maintained as the low level for more than the reference time, the start frame control signal SFC may be provided to a Schmitt trigger circuit 182, an enable signal EN may be generated by performing a NOR operation on an output signal of the Schmitt trigger circuit 182 and the load signal TP, the enable signal EN may be provided to a plurality of serially connected flip-flops 191 through 195, and a lock enable signal LOCK_EN representing that both of the start frame control signal SFC and the load signal TP are maintained as the low level for more than the reference time may be generated by performing an AND operation on output signals of the plurality of serially connected flip-flops 191 through 195. In some example embodiments, each of the plurality of serially connected flip-flops 191 through 195 may store and output its input signal at an edge (e.g., a rising edge) of each training pulse of the training pattern TPT. Further, in some example embodiments, the reference time may be determined by the number of the plurality of serially connected flip-flops 191 through 195.

When both of the start frame control signal SFC and the load signal TP are maintained as the low level for more than the reference time, or when the lock enable signal LOCK_EN having the high level is output (the lock enable signal LOCK_EN representing that both of the start frame control signal SFC and the load signal TP are maintained as the low level for more than the reference time), a clock data recovery circuit 160 may perform a training operation for an internal clock signal using the training pattern TPT included in the data signal SDS (S230). Thereafter, in an active period AP, the clock data recovery circuit 160 may recover image data ID from the data signal SDS based on the internal clock signal (S250). A data converting circuit 170 may provide a plurality of pixels PX with data voltages VD corresponding to the recovered image data RID, and the plurality of pixels PX may display an image based on the data voltages VD (S270).

Figure 8:
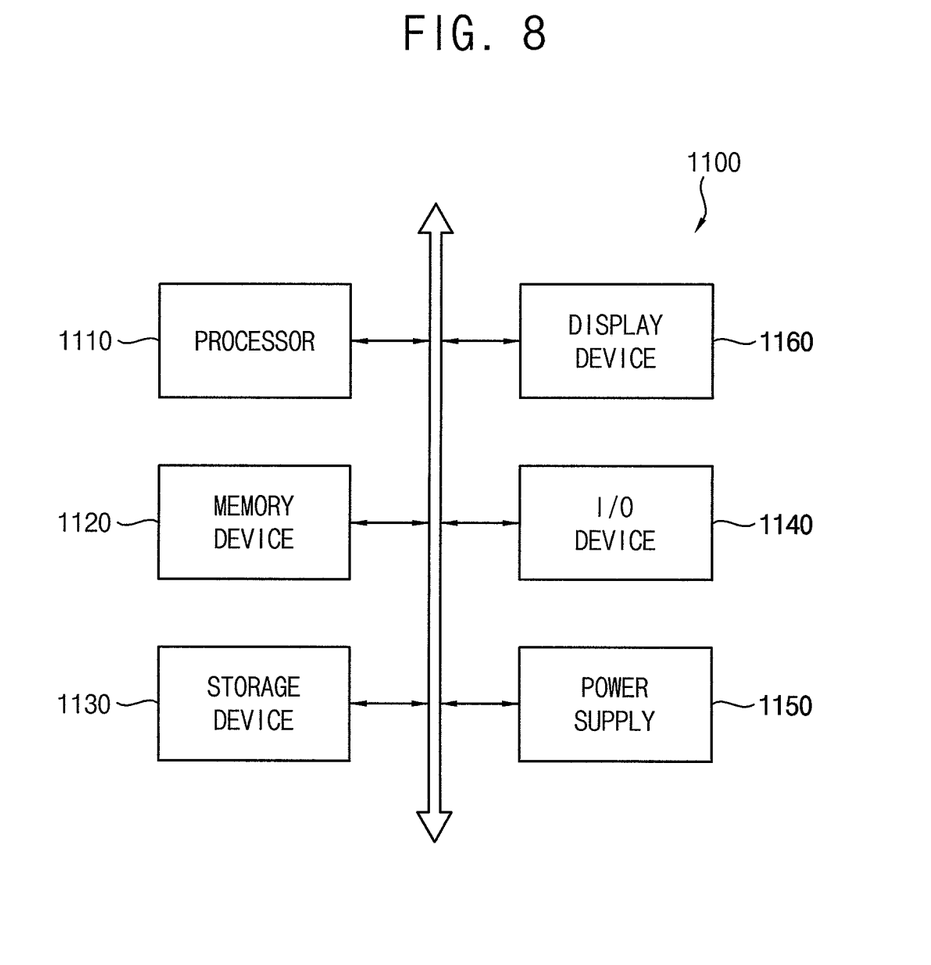
FIG. 8 is a block diagram illustrating an electronic device including a display device according to example embodiments.

FIG. 8 is a block diagram illustrating an electronic device including a display device according to example embodiments.

Referring to FIG. 8, an electronic device 1100 may include a processor 1110, a memory device 1120, a storage device 1130, an input/output (I/O) device 1140, a power supply 1150, and a display device 1160. The electronic device 1100 may further include a plurality of ports for communicating a video card, a sound card, a memory card, a universal serial bus (USB) device, other electric devices, etc.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some example embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touchscreen, etc., and an output device such as a printer, a speaker, etc. The power supply 1150 may supply power for operations of the electronic device 1100. The display device 1160 may be coupled to other components through the buses or other communication links.

The display device 1160 may perform a training operation using a training pattern included in a data signal when both of a start frame control signal and a load signal are maintained as a second level (e.g., a low level) for more than a reference time. Accordingly, even if a glitch occurs in the start frame control signal, a clock signal having a desired frequency and/or a desired phase may be recovered, and thus an operation error of a data driver may be prevented.

Some embodiments of the inventive concepts may be applied to any electronic device 1100 including the display device 1160. For example, the inventive concepts may be applied to a television (TV), a digital TV, a 3D TV, a mobile phone, a smartphone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The use of "may" when describing embodiments of the inventive concept refers to "one or more embodiments of the inventive concept."

As used herein, the terms "use," "using," and "used" may be considered synonymous with the terms "utilize," "utilizing," and "utilized," respectively.

The display device and/or any other relevant devices or components according to embodiments of the present invention described herein may be implemented utilizing any suitable hardware, firmware (e.g., an application-specific integrated circuit), software, or a combination of software, firmware, and hardware. For example, the various components of the device may be formed on one integrated circuit (IC) chip or on separate IC chips. Further, the various components of the device may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present invention.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims, and equivalents thereof. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims, and equivalents thereof.

What is claimed is:

1. A display device comprising:
a display panel comprising a plurality of pixels;
a controller configured to generate a start frame control signal that has a first level in an active period and has a second level in a blank period, a load signal that toggles between the first level and the second level in the active period such that the load signal includes a plurality of loading pulses in the active period and has the second level in the blank period, and a data signal that comprises image data in the active period and comprises a training pattern in the blank period; and
a data driver configured to recover the image data from the data signal based on an internal clock signal to provide the plurality of pixels with data voltages corresponding to the recovered image data in the active period, and to perform a training operation for the internal clock signal using the training pattern comprised in the data signal in response to both of the start frame control signal and the load signal being maintained at the second level for more than a reference time in the blank period,
wherein the start frame control signal is changed from the first level to the second level after the blank period begins and changed from the second level to the first level before the blank period ends,
wherein the data driver comprises:
a glitch removal circuit configured to generate a lock enable signal when both of the start frame control signal and the load signal are maintained as the second level for more than the reference time;
a clock data recovery circuit configured to recover the image data from the data signal by sampling the image data comprised in the data signal in response to the internal clock signal in the active period, and to perform the training operation for the internal clock signal in response to the lock enable signal in the blank period; and
a data converting circuit configured to convert the recovered image data into the data voltages, and to provide the data voltages to the plurality of pixels in the active period,
wherein the glitch removal circuit comprises:
a level determination circuit configured to generate an enable signal having the first level when both of the start frame control signal and the load signal have the second level; and
a maintenance determination circuit configured to generate the lock enable signal having the first level when the enable signal is maintained as the first level for more than the reference time, and
wherein the level determination circuit comprises:
a Schmitt trigger circuit configured to determine a level of the start frame control signal; and
a NOR gate configured to perform a NOR operation on an output signal of the Schmitt trigger circuit and the load signal.

2. The display device of claim 1, wherein the reference time corresponds to a reference number of training pulses comprised in the training pattern.

3. The display device of claim 1, wherein the maintenance determination circuit comprises:
a plurality of serially connected flip-flops configured to sequentially output the enable signal, each of the plurality of serially connected flip-flops having a clock terminal to receive the data signal; and
at least one AND gate configured to perform an AND operation on output signals of the plurality of serially connected flip-flops.

4. The display device of claim 3, wherein each of the plurality of serially connected flip-flops is configured to store and output an input signal at an edge of each training pulse of the training pattern comprised in the data signal.

5. The display device of claim 3, wherein the reference time is determined by a number of the plurality of serially connected flip-flops.

6. A data driver comprised in a display device, the data driver comprising:
a glitch removal circuit configured to receive, from a controller comprised in the display device, a start frame control signal that has a first level in an active period and has a second level in a blank period, and a load signal that toggles between the first level and the second level in the active period such that the load signal includes a plurality of loading pulses in the active period and has the second level in the blank period, and to generate a lock enable signal in response to both of the start frame control signal and the load signal being maintained at the second level for more than a reference time;
a clock data recovery circuit configured to receive, from the controller, a data signal that comprises image data in the active period and comprises a training pattern in the blank period, to recover the image data from the data signal by sampling the image data comprised in the data signal in response to an internal clock signal in the active period, and to perform a training operation for the internal clock signal using the training pattern in response to the lock enable signal in the blank period; and
a data converting circuit configured to convert the recovered image data into data voltages, and to provide the data voltages to a plurality of pixels comprised in the display device in the active period,
wherein the start frame control signal is changed from the first level to the second level after the blank period begins and changed from the second level to the first level before the blank period ends,
wherein the glitch removal circuit comprises:
a level determination circuit configured to generate an enable signal having the first level when both of the start frame control signal and the load signal have the second level; and
a maintenance determination circuit configured to generate the lock enable signal having the first level when the enable signal is maintained as the first level for more than the reference time, and wherein the level determination circuit comprises:
a Schmitt trigger circuit configured to determine a level of the start frame control signal; and
a NOR gate configured to perform a NOR operation on an output signal of the Schmitt trigger circuit and the load signal.

7. The data driver of claim 6, wherein the reference time corresponds to a reference number of training pulses comprised in the training pattern.

8. The data driver of claim 6, wherein the maintenance determination circuit comprises:
a plurality of serially connected flip-flops configured to sequentially output the enable signal, each of the plurality of serially connected flip-flops having a clock terminal to receive the data signal; and
at least one AND gate configured to perform an AND operation on output signals of the plurality of serially connected flip-flops.

9. The data driver of claim 8, wherein each of the plurality of serially connected flip-flops is configured to store and output an input signal at an edge of each training pulse of the training pattern comprised in the data signal.

10. The data driver of claim 8, wherein the reference time is determined by a number of the plurality of serially connected flip-flops.

11. A method of operating a display device, the method comprising:
determining whether both of a start frame control signal and a load signal that includes a plurality of loading pulses in an active period are maintained as a low level for more than a reference time, the start frame control signal changing from a high level to the low level after a blank period starts and changing from the low level to the high level before the blank period ends;
performing a training operation for an internal clock signal using a training pattern comprised in a data signal in response to both of the start frame control signal and the load signal being maintained at the low level for more than the reference time;
recovering image data from the data signal based on the internal clock signal; and
displaying an image by providing a plurality of pixels comprised in the display device with data voltages corresponding to the recovered image data,
wherein determining whether both of the start frame control signal and the load signal are maintained as the low level for more than the reference time comprises:
providing the start frame control signal to a Schmitt trigger circuit;
generating an enable signal by performing a NOR operation on an output signal of the Schmitt trigger circuit and the load signal;
providing the enable signal to a plurality of serially connected flip-flops; and
generating a lock enable signal representing that both of the start frame control signal and the load signal are maintained as the low level for more than the reference time by performing an AND operation on output signals of the plurality of serially connected flip-flops.

12. The method of claim 11, wherein the reference time corresponds to a reference number of training pulses comprised in the training pattern.

13. The method of claim 11, wherein each of the plurality of serially connected flip-flops is configured to store and output an input signal at an edge of each training pulse of the training pattern.

14. The method of claim 11, wherein the reference time is determined by a number of the plurality of serially connected flip-flops.

* * * * *